(12) United States Patent
Bailey

(10) Patent No.: US 6,279,469 B1
(45) Date of Patent: Aug. 28, 2001

(54) COOKIE BAKING SHEET

(76) Inventor: Almonte F. Bailey, 3115 Loma Verde Dr. #34, San Jose, CA (US) 95117

( * ) Notice: Subject to any disclaimer, the term of this patent is extended or adjusted under 35 U.S.C. 154(b) by 0 days.

(21) Appl. No.: 09/617,005

(22) Filed: Jul. 14, 2000

(51) Int. Cl.[7] .................................................. A47J 37/01
(52) U.S. Cl. ................... 99/450; 99/DIG. 15; 220/573.1; 220/912
(58) Field of Search ............................. 99/450, 422, 425, 99/426, 432, DIG. 15; 220/573.1, 574, 485, 494, 495.01, 495.03, 912

(56) References Cited

U.S. PATENT DOCUMENTS

| | | | |
|---|---|---|---|
| 33,444 | * | 10/1861 | Miller ........................................ 99/450 |
| 254,770 | * | 3/1882 | Hurd ........................................ 99/450 |
| 1,906,603 | * | 5/1933 | Hungerford ............................. 99/450 |
| 5,870,946 | * | 2/1999 | Dudley ................................. 99/450 X |

* cited by examiner

*Primary Examiner*—Reginald L. Alexander

(57) ABSTRACT

Cookie Baking Sheet with a perforated aluminum plate one sixteenth of an inch thick, seventeen and one eighth of an inch long and fifteen and three quarters of an inch wide having a plurality of regularly spaced three thirty seconds of an inch diameter circular perforations spaced five thirty seconds of and inch apart center to center, the aluminum plate having longitudinally bent edges at each wide side, the edges bent up at approximately sixty degrees from horizontal and said edges being approximately seven eighths of an inch wide, said aluminum plate having radiused corners of approximately one half of an inch, and said aluminum plate used in conjunction with a top sheet of parchment paper approximately fifteen and three eighths of an inch long by thirteen and one half inches wide.

1 Claim, 4 Drawing Sheets

COOKIE BAKING SHEET

BACKGROUND OF THE INVENTION

This invention relates generally to the field of baking accessories, and more particularly to a cookie baking sheet.

Metal sheets that facilitate the baking of cookies are known. They are typically used in conjunction with standard ovens found in most homes. The user prepares an amount of cookie dough, then breaks it into cookie sized amounts and finally places the cookies sized dough pieces onto a cookie sheet. The sheet is placed on an oven rack, the oven door is closed and the dough proceeds to cook until the proper browning and consistency is reached.

Numerous types of cookie backing sheets are on the market today. These include sheets made of steel, aluminum, non stick coated, and shiny coated. Some current cookie sheets use a double layer configuration with insulating air in between. Many of the sheets have edges that are bent up on four sides, usually at ninety degrees. This increases the sheets rigidity and gives a person a place to hold the sheet while transferring it from one location to another. Another aid used in the cooking of cookies is parchment paper. This paper is heat resistant so it can be safely placed in an oven. By putting a sheet of parchment paper over a metal cookie baking sheet, the user reduces clean up time and the cookies have less tendency to stick to the cooking surface. Additionally, a person can slide an entire tray of cookies off the baking tray by simply sliding the parchment paper off the tray.

Although many of the current cookie baking sheets available today perform a somewhat adequate job, there are some drawbacks that continue to be a problem. If not watched carefully, most cookie baking sheets cause the bottom of a cookie to become overly cooked or burnt. There is a relatively small window of time where the cookies are fully cooked and yet the cookie bottoms are not excessively burnt. If the cookies are left unattended for even a short period of time, the over cooking or burning process can ruin a batch of cookies. A few manufacturers have tried to reduce this problem by providing an insulated sheet are double walled sheet having an air gap in between, such as Insulated Bakeware by Airbake, or the Cushionair by WearEver.

Unfortunately, independant tests show that although the burning of the bottom of cookies is inhibited, The cookies fail to obtain a desirable browning and crisping effect until the entire cookie is overcooked. Other problems with current cookie baking sheets include the fact that most sheets have bent up edges on all four sides. Although these edges improve the stability of the sheet, the sharp ninety degree bends tend to cause the sheet to warp during heating thereby causing cookies to slide around and assume odd shapes. Additionally, the bent edges on all sides make it difficult to slide a sheet of cookie topped parchment paper off of the cookie sheet without disrupting the cookies.

SUMMARY OF THE INVENTION

The primary object of the invention is to provide a cookie baking sheet that helps cook cookies evenly on top and bottom.

Another object of the invention is to provide a cookie baking sheet that accommodates an additional sheet of parchment paper to eliminate clean up and speed the transfer of cooked cookies from said baking sheet to a kitchen counter.

Another object of the invention is to provide a cookie baking sheet that allows the user to easily slide said parchment paper and associated cookies from said cookie sheet to an adjoining surface.

A further object of the invention is to provide a cookie baking sheet that has easy to grab side walls that do not cause warping of the cookie sheet when heated.

Other objects and advantages of the present invention will become apparent from the following descriptions, taken in connection with the accompanying drawings, wherein, by way of illustration and example, an embodiment of the present invention is disclosed.

Cookie Baking Sheet comprising: a perforated aluminum plate one sixteenth of an inch thick, seventeen and one eighth of an inch long and fifteen and three quarters of an inch wide having a plurality of regularly spaced three thirty seconds of an inch diameter circular perforations spaced five thirty seconds of and inch apart, said aluminum plate having longitudinally bent edges at each wide side, said edges bent up at approximately sixty degrees from horizontal and said edges being approximately seven eighths of an inch wide, said aluminum plate having radiused corners of approximately one half of an inch, and said aluminum plate used in conjunction with a top sheet of parchment paper approximately fifteen and three eighths of an inch long by thirteen and one half inches wide.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
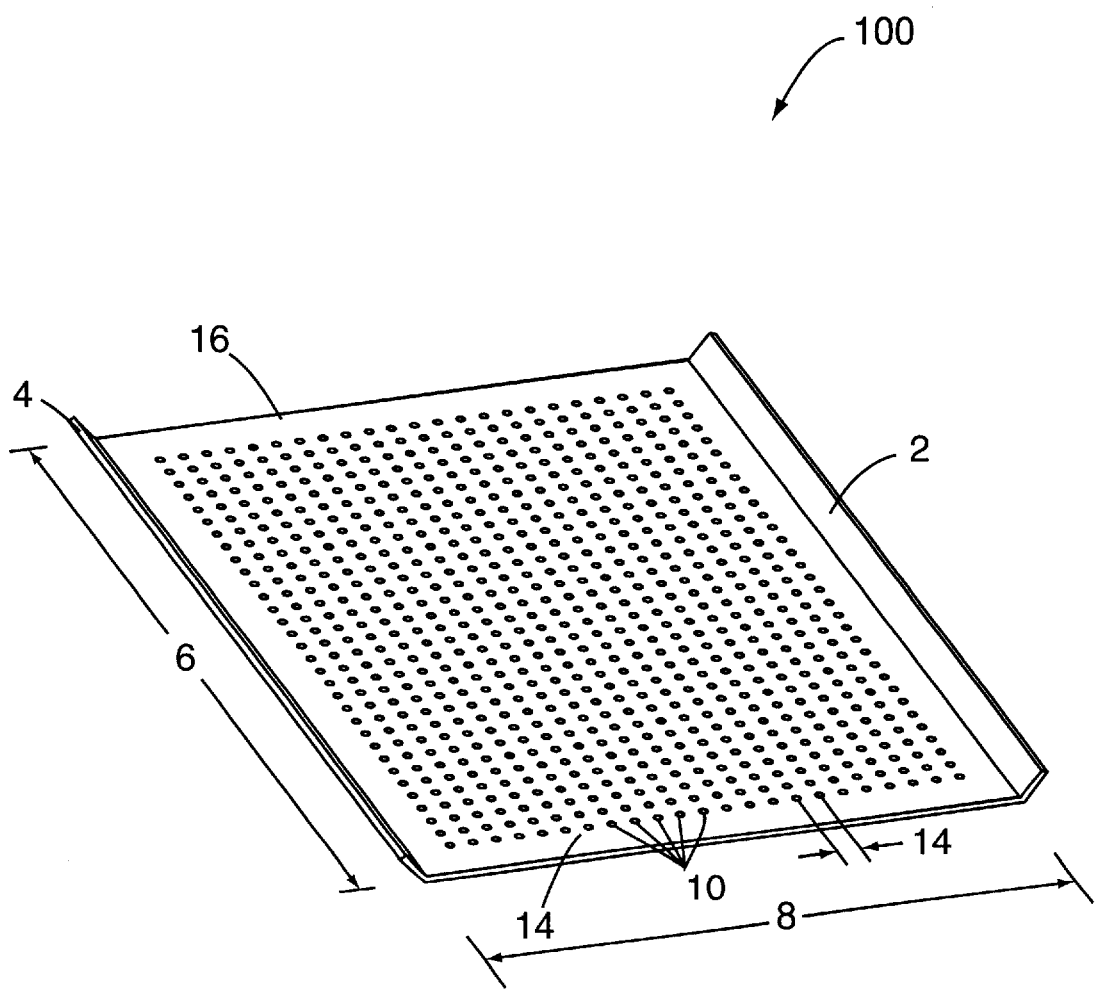
FIG. 1 is a perspective view of the cookie baking sheet of the present invention
Figure 2:
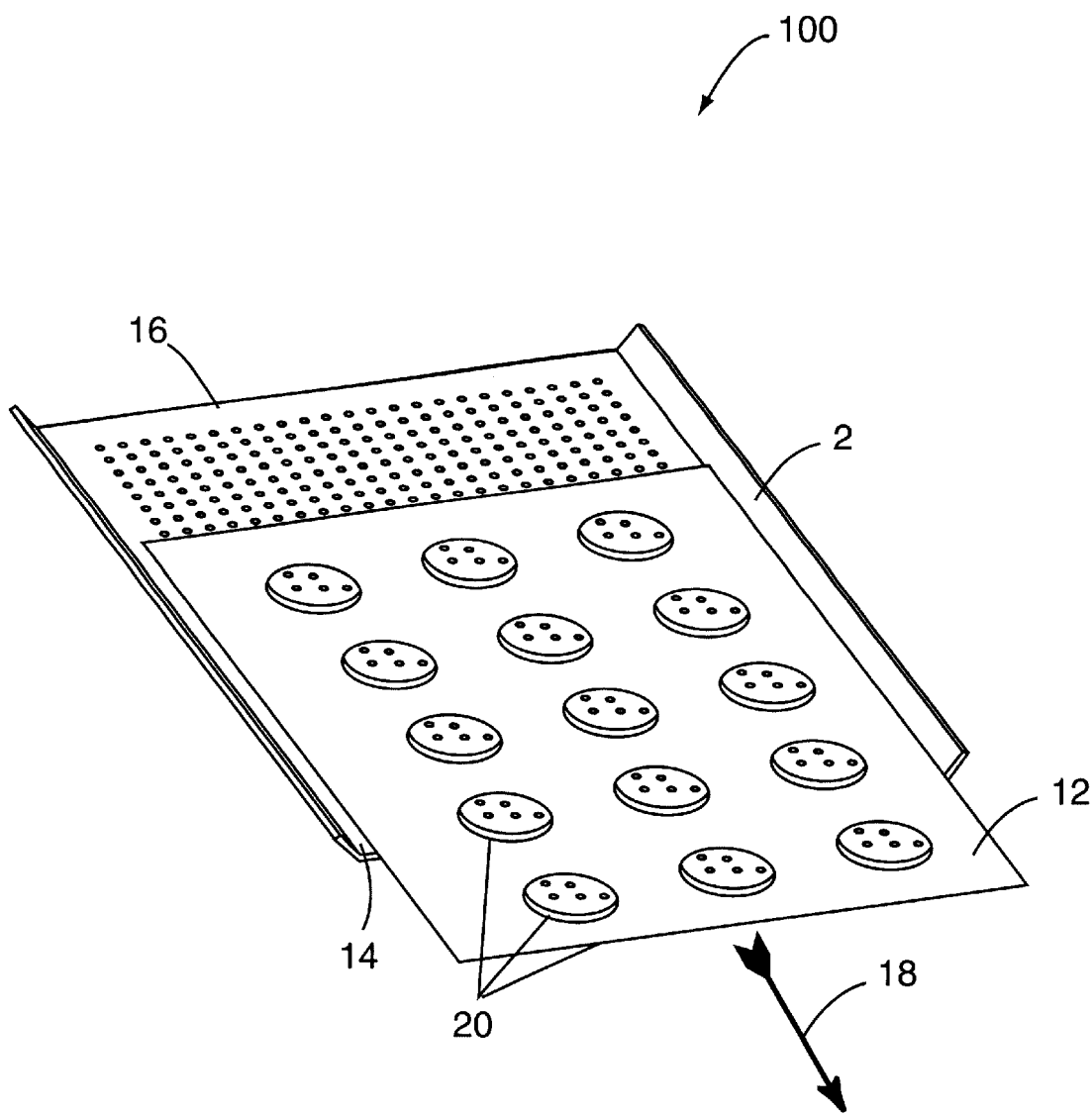
FIG. 2 is a perspective view of the invention with a sheet of parchment paper
Figure 3:
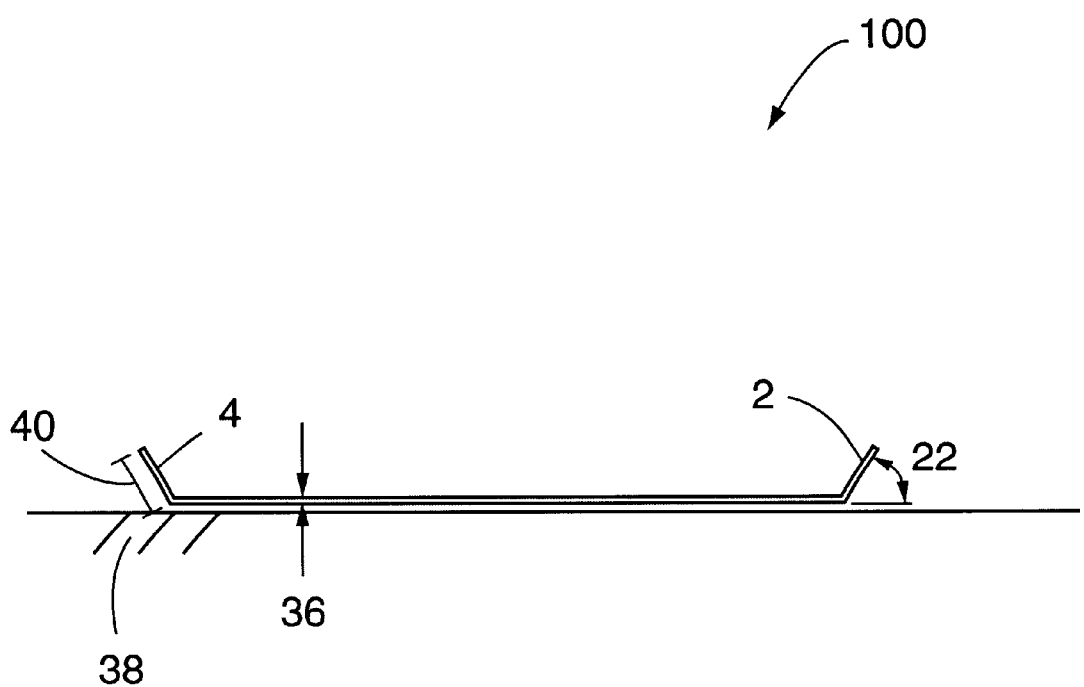
FIG. 3 is a front view of the present invention
Figure 4:
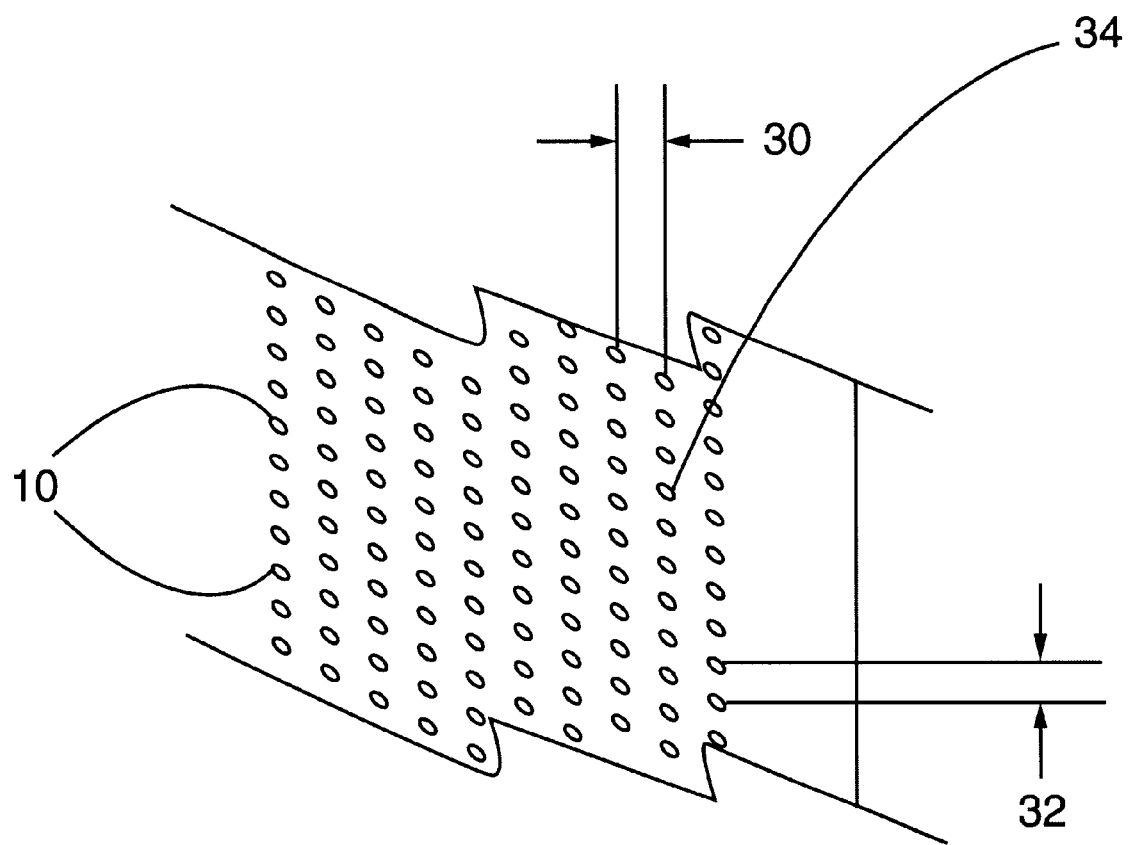
FIG. 4 is a detail view of the hole pattern in the sheet of the present invention.

Referring now to FIG. 1 we see a perspective view of the cookie baking sheet of the present invention 100. The sheet is made of aluminum that is one sixteenth of an inch thick. Aluminum provides more even cooking properties as compared to steel. The thickness is ideal for not producing hot spots and thereby evenly cooking cookies. It also is thick enough not to warp or twist while picking up the sheet 100 when it is loaded with cookies. The overall dimensions of the sheet are approximately seventeen and one eighth inches long 6 by fifteen and three quarters of an inch wide 8. Although these dimesnions are the preferred embodiment, a variation of several inches in width or length is acceptable. The bent sides 2, 4 add rigidity. The edges 2, 4 are bent to approximately sixty degrees because my tests have shown that bending to ninety degrees, as is the case with most other cookie sheets, will cause the cookie sheet to warp during heating, which may cause cookies to slide or become deformed. Additionally, I have found that the sixty degree bend makes it easier to pick up the cookie sheet by edges 2, 4. The sheet is evenly perforated with a plurality of holes 10. These holes are key to producing even browning, but not burning, of the bottoms of baked cookies. Most other cookie sheets have to be watched carefully and frequently when baking cookies because the cookie bottom burning effect can happen relatively rapidly. The perforations 20 in the sheet of the present invention produce a perfect browning effect on the bottom of most cookies as well as perfect cook through in each cookie. For purposes of simplicity I will be referring only to cookies, however the present invention 100 works equally as well for other baked goods such as biscuits and the like. The time window within which the perfect browning occurs is much greater than with previously existing cookie sheets. This allows the baker a greater degree of freedom with respect to the frequency of checking on the baking process. FIG. 2 shows the present invention 100 with parchment paper 12 on top. Parchment paper 12 is readily available at most stores that sell cooking accessories. It is designed to be used in an oven and is food safe and flame resistant. By placing parchment paper 12 on top of cookie sheet 100 The cookies 20 can not stick to aluminum sheet 100. Additionally, the baker can pull the entire sheet of baked cookies 20 off the aluminum sheet 100 and let them cool. Another batch of raw cookies on another sheet of parchment paper can now be pulled along non bent edge 8 and onto the aluminum sheet 100. Parchment sheet 12 also eliminates the need for the baker to grease or oil the sheet before baking. Because sheet 100 edges 14, 16 are not bent, parchment sheet 12 can be pulled, as represented by arrow 8, without upsetting the cookies. The cooled cookies 20 can be easily removed from parchment sheet 12. FIG. 3 shows a front view of the cookie sheet 100 of the present invention. Bent edges 2, 4 are approximately seven eighths of an inch wide 40 and bent at an a sixty degree angle 22 with respect to a horizontal plane 38. The overall thickness of the sheet 100 is one sixteenth of an inch 36. FIG. 4 shows a partial view of sheet 100 and shows the size and placement of holes 10. Each hole 10 is three thirty seconds of an inch in diameter 34. The hole spacing from center to center 32 is Five thirty seconds of an inch along each row and five thirty seconds of an inch center to center 30 between rows.

The description and illustrations above demonstrate that the cookie baking sheet of the present invention helps a baker to bake cookies and the like more evenly, with less burning and breakage than other current baking sheets. The cookie baking sheet of the present invention does not warp and is easy to clean.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Cookie Baking Sheet comprising:

a perforated aluminum plate one sixteenth of an inch thick, seventeen and one eighth of an inch long and fifteen and three quarters of an inch wide having a plurality of regularly spaced three thirty seconds of an inch diameter circular perforations spaced five thirty seconds of and inch apart from center to center;

said aluminum plate having longitudinally bent edges at each wide side, said edges bent up at approximately sixty degrees from horizontal and said edges being approximately seven eighths of an inch wide;

said aluminum plate having radiused corners of approximately one half of an inch; and said aluminum plate used in conjunction with a top sheet of parchment paper approximately fifteen and three eighths of an inch long by thirteen and one half inches wide.

\* \* \* \* \*